(12) United States Patent
Hahn

(10) Patent No.: US 6,736,362 B2
(45) Date of Patent: May 18, 2004

(54) SELF ALIGNING LINKSHAFT SUPPORT BEARING BRACKET

(75) Inventor: Steven C. Hahn, Shelby Township, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

(21) Appl. No.: 10/167,735

(22) Filed: Jun. 12, 2002

(65) Prior Publication Data

US 2003/0230683 A1 Dec. 18, 2003

(51) Int. Cl.[7] .................................................. A47H 1/00
(52) U.S. Cl. ........................ 248/300; 248/200; 248/247
(58) Field of Search ................................ 248/300, 200, 248/247; 74/498, 517, 537, 508, 103

(56) References Cited

U.S. PATENT DOCUMENTS

| | | | | |
|---|---|---|---|---|
| 4,447,094 A | * | 5/1984 | Trudeau et al. | 384/145 |
| 4,838,101 A | * | 6/1989 | Dobberpuhl et al. | 74/15.63 |
| 5,020,820 A | * | 6/1991 | Renner et al. | 280/439 |
| 5,902,050 A | * | 5/1999 | Balczun et al. | 384/206 |
| 6,003,394 A | * | 12/1999 | Heckel, Jr. | 74/89.36 |
| 6,056,131 A | * | 5/2000 | Mowbray | 211/104 |
| RE36,771 E | * | 7/2000 | Carlson | 285/305 |
| 6,082,207 A | * | 7/2000 | Babinski | 74/89.28 |

OTHER PUBLICATIONS

U.S. patent Publication U.S. 2002/0021849 to Whaley, Feb. 2002, Self –Aligning Spherical Bearing Assembly 384/206.*

* cited by examiner

Primary Examiner—Amy Sterling
(74) Attorney, Agent, or Firm—Mick A. Nylander

(57) ABSTRACT

A linkshaft support bearing bracket system for use in an automotive vehicle having an engine and a transaxle with a linkshaft. The linkshaft support bearing bracket system includes a spherical bearing wherein that bearing has an orifice through a center point thereof. The linkshaft is arranged within that orifice. The linkshaft support system also includes a first bearing retainer and a second bearing retainer adjacent to one another. The spherical bearing is arranged within the first bearing retainer and the second bearing retainer. A support bracket is attached to the automotive engine. The first bearing retainer and the second bearing retainer are secured to the support bracket. The first and second bearing retainer will allow for multiple axes of movement of the spherical bearing relative to the link shaft and the transaxle.

18 Claims, 3 Drawing Sheets

SELF ALIGNING LINKSHAFT SUPPORT BEARING BRACKET

TECHNICAL FIELD

The present invention generally relates to link systems between an engine and transmission, and more particularly relates to a linkshaft system that is self-aligning for use in an automotive vehicle.

BACKGROUND ART

Linkshaft systems have been known for numerous years in the art. The prior art linkshaft is generally supported by a bracket that is connected to the engine or other part of the automobile near the front of the automobile. The linkshaft is then extended into the transaxle and into its proper position in the gearing system of the transmission. In the prior art the support bracket has a variety of shapes and designs associated with different features necessary to hold the linkshaft at a proper position relative to the transaxle. Many of the prior art linkshaft systems use a mechanism that includes a bearing wherein the linkshaft is placed through the bearing and then a strap is secured around the bearing. This strap will hold the bearing in place by a radial force acting on the bearing. Other prior art linkshaft support mechanisms generally included a strap in some form to support and hold the linkshaft in a proper position relative to the transaxle.

Many of these prior art linkshafts support systems are cumbersome to install and were difficult to align properly thus leading to linkshafts not being properly aligned with the transaxle at a proper angle. Furthermore, many of the prior art strapped mechanisms in use for holding the linkshaft and linkshaft support bearing in position may lead to binding of the linkshafts rotational movement and/or early failure of the bearing because of improper fit in the support mechanism. Furthermore, proper installation by assembly workers is a time consuming and labor intensive task. Also, the prior art linkshaft support systems are expensive to manufacture due to machining requirements and tolerances necessary to have appropriate linkshaft operation in the automotive environment.

Therefore, there is a need in the art for a linkshaft support bearing bracket system that is capable of self-alignment with the transaxle system. Furthermore, there is a need in the art for a linkshaft support bearing bracket system that includes pre-manufactured brackets that engage with and mate with a predetermined shaped bearing thus allowing for rotational freedom of movement of the linkshaft and bearing while also improving durability in the automotive environment. Furthermore, there is a need in the art for a linkshaft support bearing bracket system that allows for two axes of movement of the bearing thus insuring the linkshaft will be properly aligned with the transmission output and the support bracket for the linkshaft.

DISCLOSURE OF THE INVENTION

One object of the present invention is to provide an improved linkshaft support bearing bracket.

Another object of the present invention is to provide a self-aligning linkshaft support bearing bracket system.

Still another object of the present invention is to provide a linkshaft support bearing system that allows for a spherical bearing to be self-aligned within bearing retainers that have matching spheres to the bearing.

Still another object of the present invention is to provide a self-aligning linkshaft support bearing bracket system that allows for two axes of movement such that the bearing and linkshaft are properly aligned with the transmission output and the support bearing bracket.

Still another object of the present invention is to provide a low cost and easier to install support bearing bracket system for a linkshaft.

To achieve the fore going objects, a linkshaft bracket system for use in a vehicle is disclosed. The linkshaft bracket system includes a spherical bearing. The linkshaft bracket system includes a first bearing retainer and a second bearing retainer. The spherical bearing will be arranged between the first and second bearing retainers. The linkshaft bracket system also includes a support or main bracket fastened to the first and second bearing retainer and an automotive engine. The spherical bearing will be capable of movement along two axes to allow for alignment of the bearing and the linkshaft.

One advantage of the present invention is that the linkshaft support bearing bracket system will be self-aligning.

Another advantage of the linkshaft support bearing bracket system is that the spherical bearing will be self-aligned by two bearing retainers that have matching spears to that of the spherical bearing.

Still another advantage of the present invention is that the linkshaft support bearing bracket will allow for two axes of movement of the bearing and linkshaft such that the linkshaft is aligned with the transmission output and support bracket.

Still another advantage of the present invention is the reduced cost of the linkshaft system.

Yet another advantage of the present invention is that the linkshaft support bearing bracket system will allow for easier installation of the linkshaft between the support bracket and the transmission/transaxle.

Other objects, features and advantages of the present invention will become apparent from the subsequent description and appended claims, taken in conjunction with the accompanying drawings.

BEST MODES FOR CARRYING OUT THE INVENTION

Figure 1:
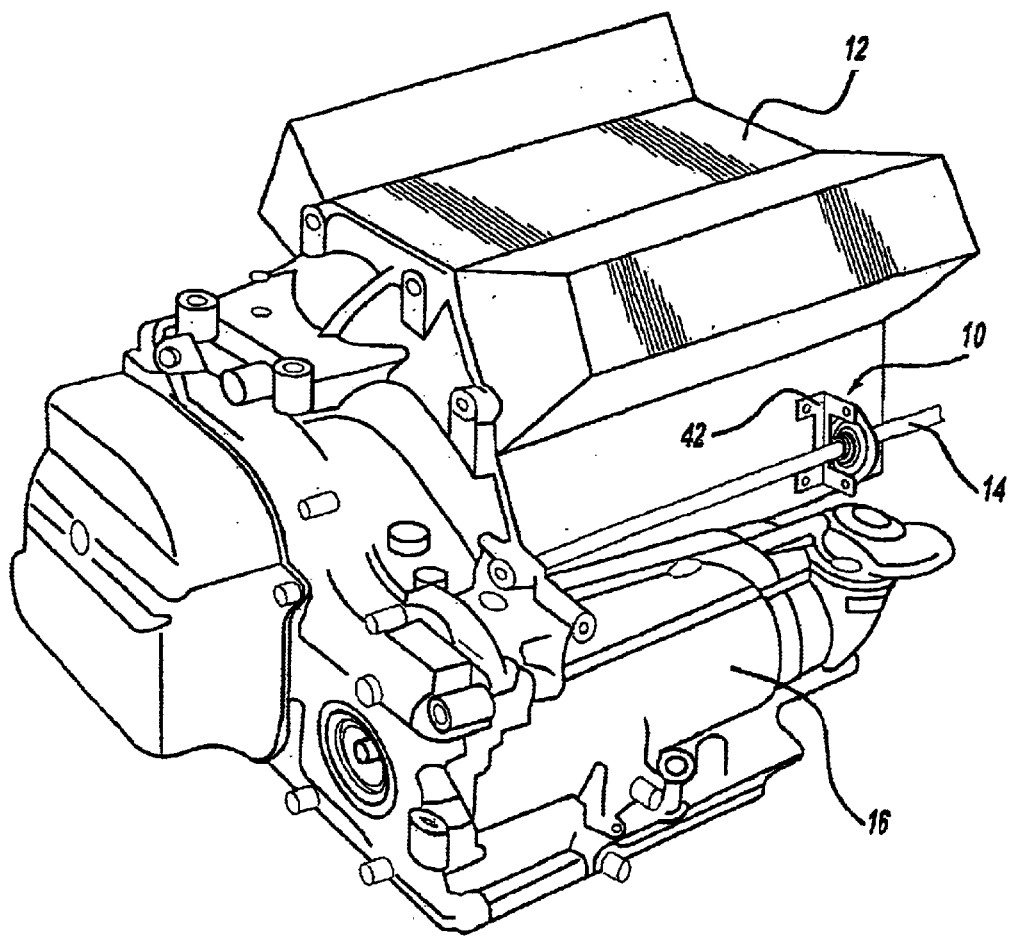
FIG. 1 shows a plan view of the linkshaft support bearing bracket system according to the present invention.

Referring to the drawings, a self-aligning linkshaft support bearing bracket system 10 according to the present invention is shown.

FIG. 1 shows a linkshaft support bearing bracket system 10 according to the present invention. The linkshaft support bearing bracket system 10 is generally for use in an automotive vehicle. The linkshaft support bearing bracket system 10 is generally connected or secured to an automotive engine 12. The linkshaft support bearing bracket 10 aligns and securely holds a linkshaft 14 in relation to a transaxle or transmission 16 of the automotive vehicle. The transmission 16 then distributes power from the engine 12 to the drivetrain and eventually on to the wheels of the automotive vehicle.

FIG. 1 shows an engine 12 connected to a transmission 16 as found in a front wheel drive automotive vehicle. The linkshaft support bearing bracket system 10 is connected to the engine 12. The linkshaft 14 is connected to the transaxle 16 while being supported by the linkshaft support bearing bracket 10. The linkshaft 14 generally has a circular rod like shape however, any other shape can be used depending on the automotive environment and design characteristics needed.

Figure 2:
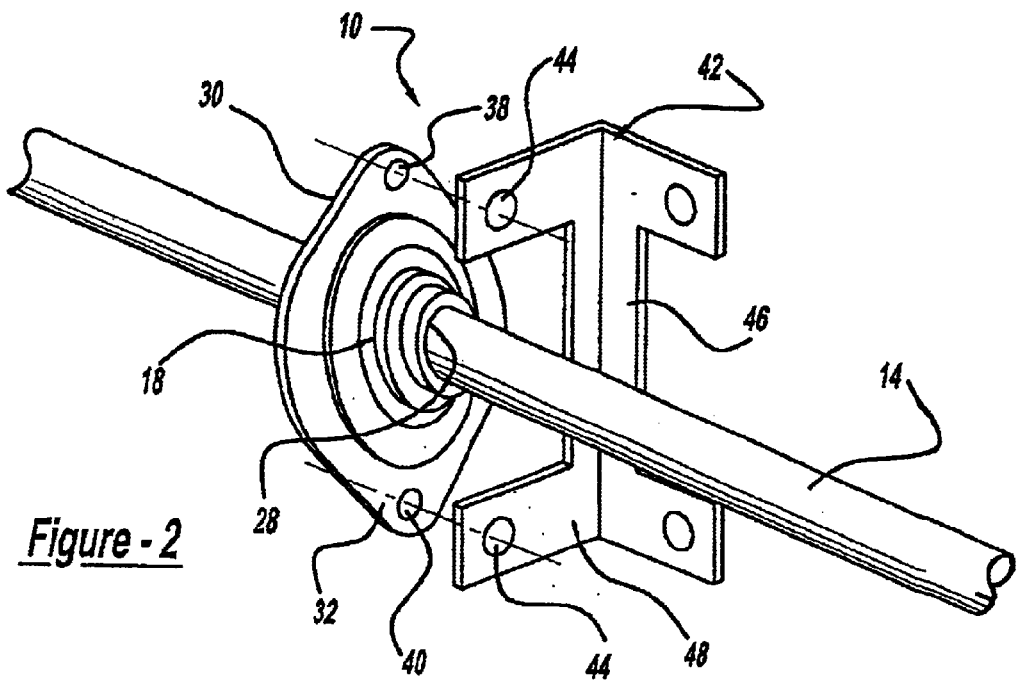
FIG. 2 shows a semi exploded view of the linkshaft support bearing bracket according to the present invention.
Figure 3:
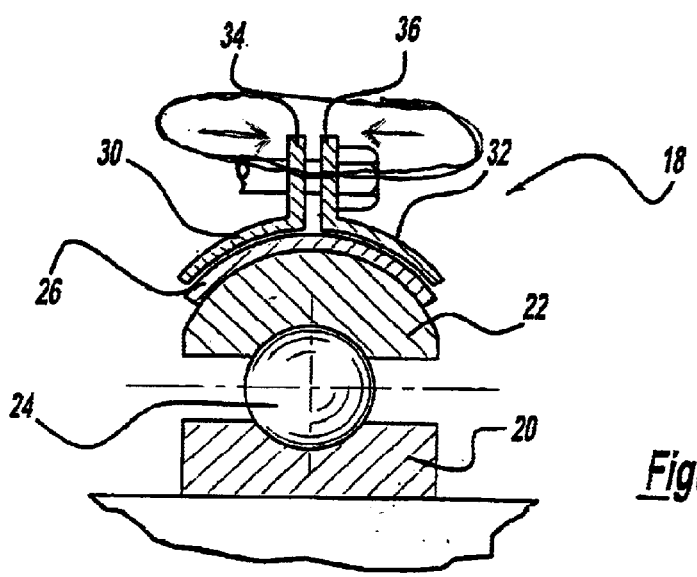
FIG. 3 shows a cross section of the linkshaft support bearing bracket according to the present invention.

FIGS. 1 through 3 show the linkshaft support bearing bracket 10 according to the present invention. The linkshaft support bearing bracket system 10 includes a spherical bearing 18. It should be noted that any other type or shape of bearing may be used, but in this embodiment a spherical bearing is the bearing of choice. The spherical bearing 18 includes an inner race 20 and outer race 22. At least one rolling element 24 is arranged between the inner race 20 and outer race 22 of the spherical bearing 18. The outer race 22 includes a spherical outer casing 26 which conforms to the outer race 22 predetermined spherical shape. The inner race 20 has an orifice 28 through a center point thereof. In one embodiment the orifice 28 is a circular orifice that will mate with and support the linkshaft 14 in a predetermined position. The link shaft 14 will be able to rotate within the spherical bearing 18. In one embodiment the inner race 20, outer race 22 and the rolling element 24 are made of a metal material however any other type of composite or hard material may also be used depending on the weight requirements and design requirements of the automotive vehicle.

A first bearing retainer 30 and a second bearing retainer 32 generally having an oblong shape are arranged around the spherical bearing 18. The first and second bearing retainers 30, 32 are aligned such that an appendage 34, 36 on the outer circumference of the first and second bearing retainers 30, 32, respectively, are in contact around the entire circumference of the bearing retainers 30, 32. The first and second bearing retainers 30, 32 include a first orifice 38 and a second orifice 40 through an end portion of each bearing retainer 30, 32. The orifices 38, 40 are arranged such that they align with one another when the first and second bearing retainers 30, 32 are placed in position. The first and second bearing retainers 30, 32 are aligned such that they will sandwich or hold the spherical bearing 18. The spherical bearing 18 will be self-aligned within the first and second bearing retainers 30, 32. The first and second bearing retainers 30, 32 also include on the inner circumference thereof, a spherical shape that will match the outer spherical shape of the spherical bearing 18. This will allow for precise adjustment and proper positioning and retaining of the spherical bearing 18 in the bearing retainers 30, 32. The use of the first and second bearing retainers 30, 32 will also allow for the spherical bearing 18 to have two axes of movement relative to the bearing retainers 30, 32. This will allow the linkshaft 14 to be aligned with the transmission 16 output and the linkshaft support bearing bracket system 10 thus allowing for free rotation and non-binding movement of the linkshaft 14. The first and second bearing retainers 30, 32 are connected to one another through the orifices 38, 40 as described above. Any type of known fastener may be used, in one embodiment a nut and bolt arrangement is the preferred fastener.

A support bracket 42 is attached to the engine 12 on one side thereof. On the opposite side of the support bracket 42 the first and second bearing retainers 30, 32 are secured via the fasteners as described above. Thus, the first and second orifices 38, 40 on the first and second bearing retainers 30, 32 are secured through mutually aligned set of orifices 44 on the support bracket 42. In one embodiment the support bracket 42 is made of a metal material but it should be noted that any other type of hardened plastic, ceramic material or the like may also be used depending on the design requirements of the automotive vehicle. In one embodiment, as shown in FIG. 2, the support bracket 42 generally includes a first c-shaped section 46 and a second c-shaped section 48 that are joined at a right angle. The joint maybe that of a weld or the joint maybe formed in a mold or the joint maybe formed by bending of the metal. The orifice 44 is located near the end of each extension of the support bracket 42. Two of the orifices 44 are used to connect to the engine 12 while the other two are used to connect the support bracket 42 to the first and second bearing retainers 30, 32.

In operation the linkshaft support bracket system 10 allows for the linkshaft 14 to be aligned in less time and with fewer steps via the self aligning bearing 18, which supports the linkshaft 14 and the linkshaft bracket system 10. The spherical bearing 18 has two axes of movement relative to the first and second bearing retainers 30, 32. During installation of the system the linkshaft 14 is placed through the spherical bearing 18 and then into the transaxle or transmission 16 and then the bearing retainers 30, 32 are placed around the spherical bearing 18. It should be noted that if the spherical bearing 18 is other than a spherical shape the inner surface of the first and second bearing retainers 30, 32 will match whatever shape the bearing 18 has on its outer surface. The first and second bearing retainers 30, 32 are arranged around the spherical bearing 18 and then secured with one another on the outer periphery thereof. The first and second bearing retainers 30, 32 will be aligned with the orifices 44 on the support bracket 42 and via a fastener, the support bracket 42 and first and second bearing retainers 30, 32 will be compressed into and secured to one another. In one embodiment a nut and bolt fastener is used to connect the first and second bearing retainers 30, 32 to the support bracket 42. The ability of the spherical bearing 18 to have two axes of movement within the first and second bearing retainers 30, 32 will allow for proper alignment of the support bracket 42 and the output of the transmission or transaxle 16 which is the connection between the linkshaft 14. The first and second bearing retainers 30, 32 will hold the spherical bearing 18 in position by an axial force which will allow for non-binding rotation of the linkshaft 14 and non-binding movement of the spherical bearing 18 within the first and second bearing retainers 30, 32 along the two axes of movement of the spherical bearing 18 within the spherical bearing retainers 30, 32. Prior art systems created a radial force on the spherical bearing thus binding the bearing and not allowing for full rotational movement and/or adjustment on any axes. Thus, the linkshaft support bracket system 10 according to the present invention will provide a lighter weight, lower cost and easier to install linkshaft support bracket system 10 for automotive manufacturers.

Figure 4:
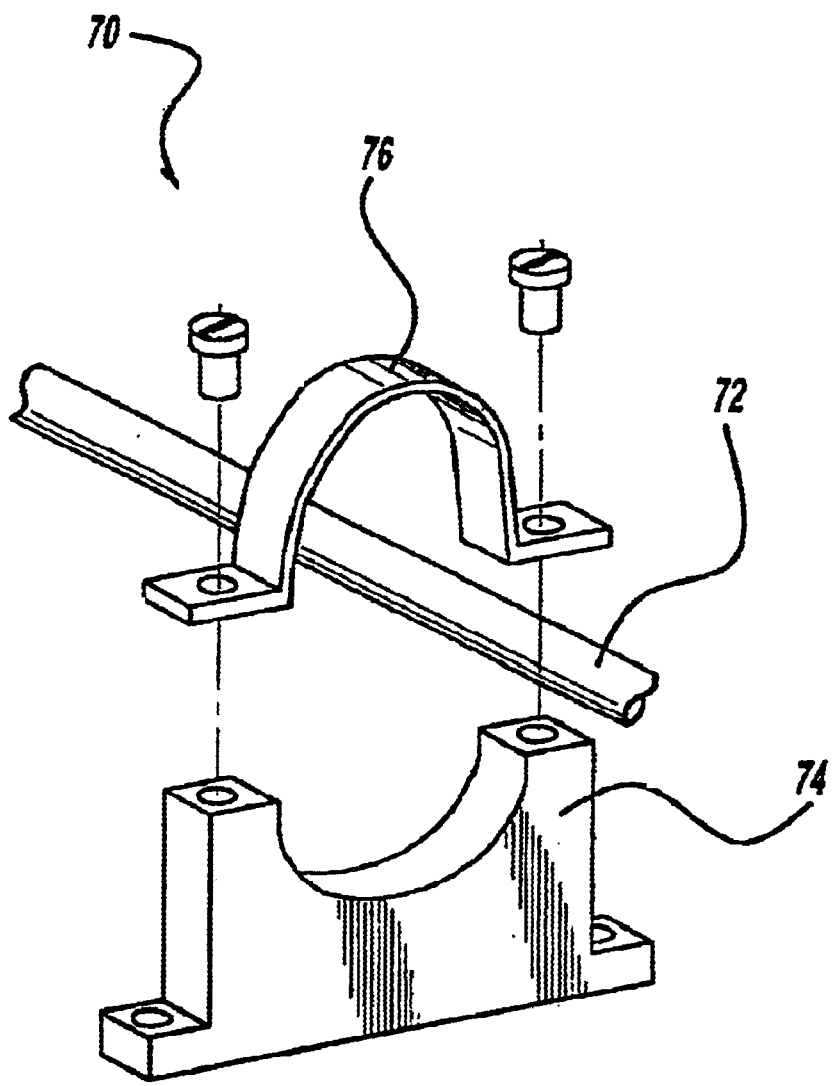
FIG. 4 shows a prior art linkshaft bracket system.

FIG. 4 shows a prior art linkshaft support system 70. In this system the linkshaft 72 is placed within a bearing (not shown). The bearing is held in place within a support bracket 74 by a band or bracket 76. The band 76 holds the bearing in place by a radial force and thus may be capable of binding the linkshaft 72 within the bearing and also would not allow for any movement of the bearing with respect to any axes along the linkshaft axes. The band 76 is connected to the support bracket 74 via any known fasteners 78 such as screws. The use of the band 76 does not allow for any adjustments at all of the bearing. Therefore, if the bearing is not properly aligned during installation, then the linkshaft 72 operation could be compromised.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention maybe practiced otherwise then as specifically described.

What is claimed is:

1. A linkshaft bracket system for use in a vehicle, said linkshaft bracket system including:
   a spherical bearing, said spherical beaaring having a rolling element arranged between an inner race and an outer race;
   a first and second bearing retainer, said spherical bearing arranged between said first and second bearing retainer, said bearing retainers having a spherical shape on an inner circumference that is approximately the same as said spherical shape of said bearing; and
   a main bracket fastened to said first and second bearing retainer.

2. The linkshaft bracket system of claim 1 wherein said first bearing retainer and said second bearing retainer engages with one another along an outer peripheral edge thereof.

3. The linkshaft bracket system of claim 2 wherein said spherical bearing is capable of movement on two axes.

4. The linkshaft bracket system of claim 2 wherein said spherical bearing having non-binding rotation within said first and second bearing retainer.

5. The linkshaft bracket system of claim 1 wherein said first and second bearing retainers are made of a metal material.

6. The linkshaft bracket system of claim 1 wherein said first and second bearing retainers are made of a plastic or composite material.

7. The linkshaft bracket system of claim 1 wherein said spherical bearing is retained and positioned by an axial force.

8. A linkshaft support bearing bracket system for use in an automotive vehicle having an engine and a transaxle with a linkshaft extended there between, said system including:
   a spherical bearing, said bearing having an orifice through a center point thereof, the linkshaft arranged in said orifice;
   a first bearing retainer and a second bearing retainer adjacent to one another, said spherical bearing arranged between said first bearing retainer and said second bearing retainer, said first bearing retainer and said second bearing retainer each having an inner surface that forms a spherical shape that matches said spherical bearing outer surface shape; and
   a support bracket attached to the engine, said first bearing retainer and said second bearing retainer secured to said support bracket.

9. The system of claim 8 wherein said spherical bearing is self-aligning.

10. The system of claim 8 wherein said first bearing retainer and said second bearing retainer contact one another on an outer periphery thereof, said first and second bearing retainer having at least two orifices, said orifices of said first bearing retainer aligns with said orifices of said second bearing retainer.

11. The system of claim 8 wherein said first bearing retainer and said second bearing retainer are secured to said support bracket by a fastener.

12. The system of claim 8 wherein said first bearing retainer and said second bearing retainer position and retain said spherical bearing by an axial force.

13. The system of claim 9 wherein said spherical bearing is capable of movement and adjustments on two axes, allowing for the linkshaft to properly align with the transaxle and said support bracket.

14. The system of claim 8 wherein said support bracket is attached to the engine by a fastener.

15. The system of claim 8 wherein said support bracket and said first and second bearing retainer are made of a metal material.

16. The system of claim 8 wherein said support bracket and said first and second bearing retainer are made of a composite or plastic material.

17. An automotive vehicle, said vehicle including:
   an engine;
   a transmission connected to said engine;
   a driveline system connected to said transmission;
   a linkshaft extended between said transmission and said engine;
   a linkshaft support bracket secured to said engine;
   a first bearing retainer and a second bearing retainer connected to said support bracket;
   a spherical bearing arranged between and positioned by said first and second bearing retainers, said bearing retainers provide an axial force to hold said spherical bearing, said spherical bearing having an orifice there through, said orifice receives said linkshaft; and
   said first and second bearing retainers having a spherical shape on an inner surface that is approximately the same as said spherical shape of said spherical bearing.

18. The vehicle of claim 17 wherein said spherical bearing is self-aligning, said spherical bearing is capable of movement along two axes which allows said linkshaft to align with said transmission at an output and said support bracket.

* * * * *

UNITED STATES PATENT AND TRADEMARK OFFICE
CERTIFICATE OF CORRECTION

PATENT NO. : 6,736,362 B2 Page 1 of 1
DATED : May 18, 2004
INVENTOR(S) : Steven C. Hahn It is certified that error appears in the above-identified patent and that said Letters Patent is hereby corrected as shown below:

Column 5,
Line 8, change "then" to -- than --
Line 13, change "beaaring" to -- bearing --

Signed and Sealed this

Thirtieth Day of November, 2004

JON W. DUDAS
*Director of the United States Patent and Trademark Office*